Figure 1A:
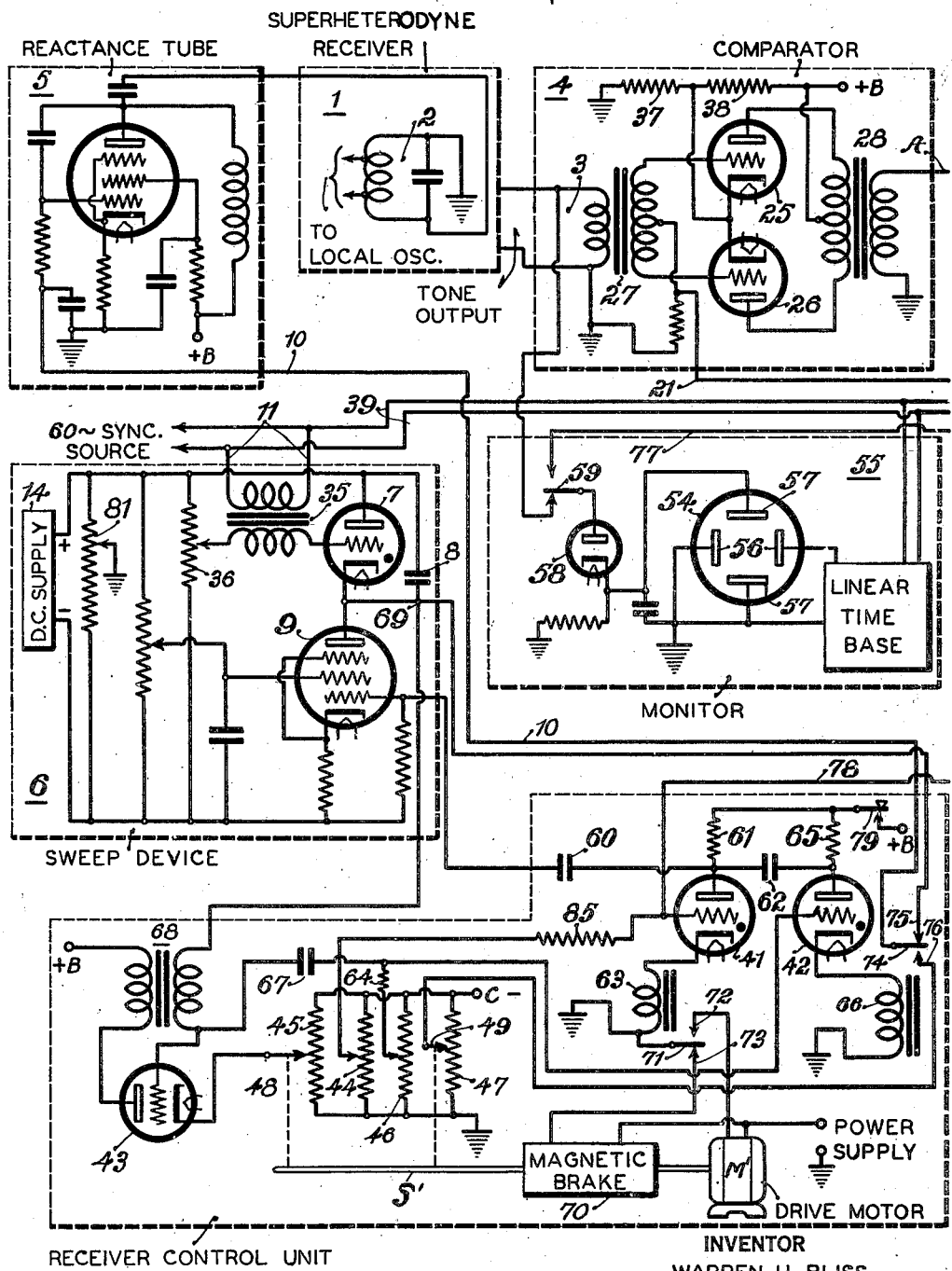

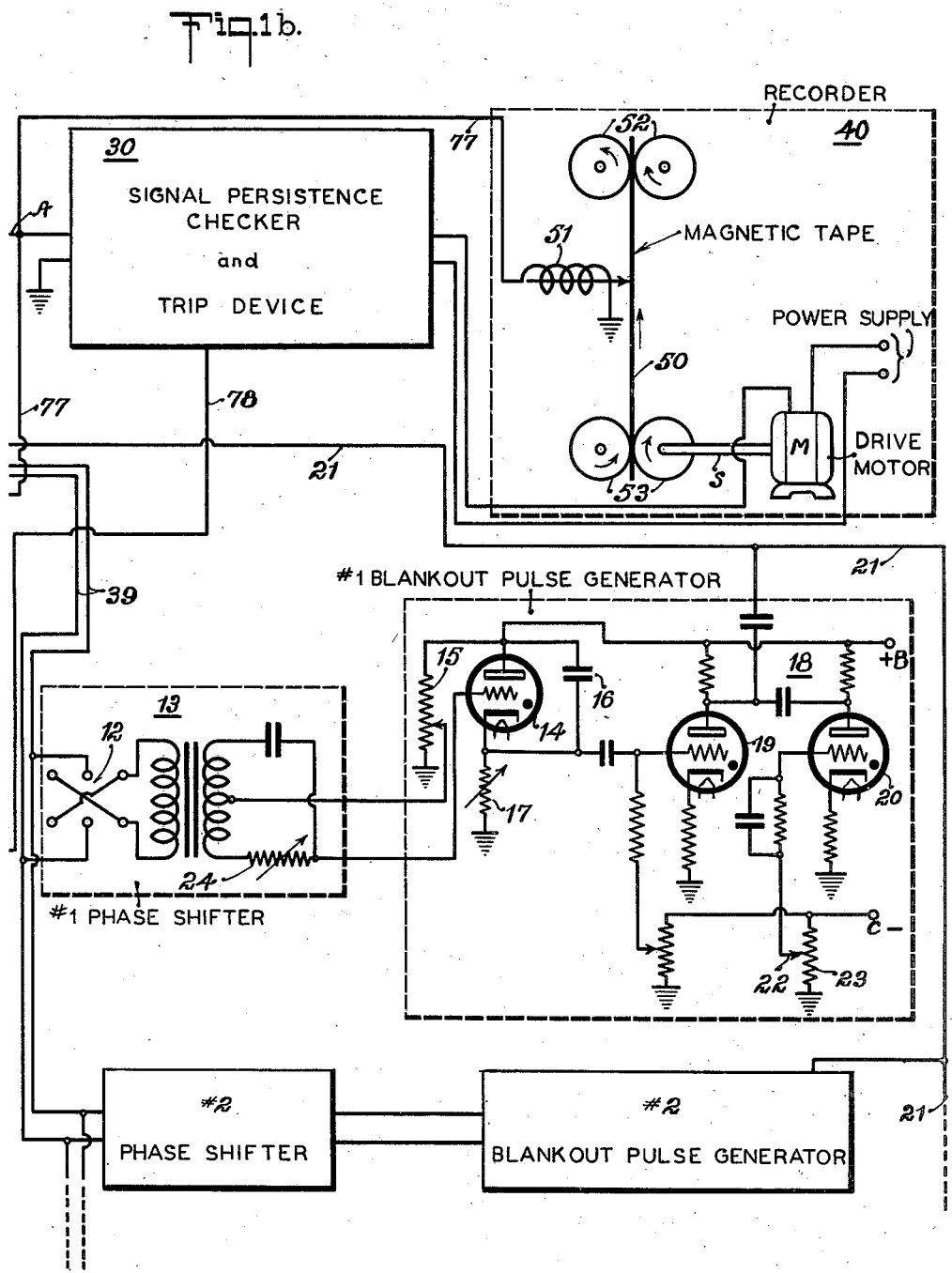

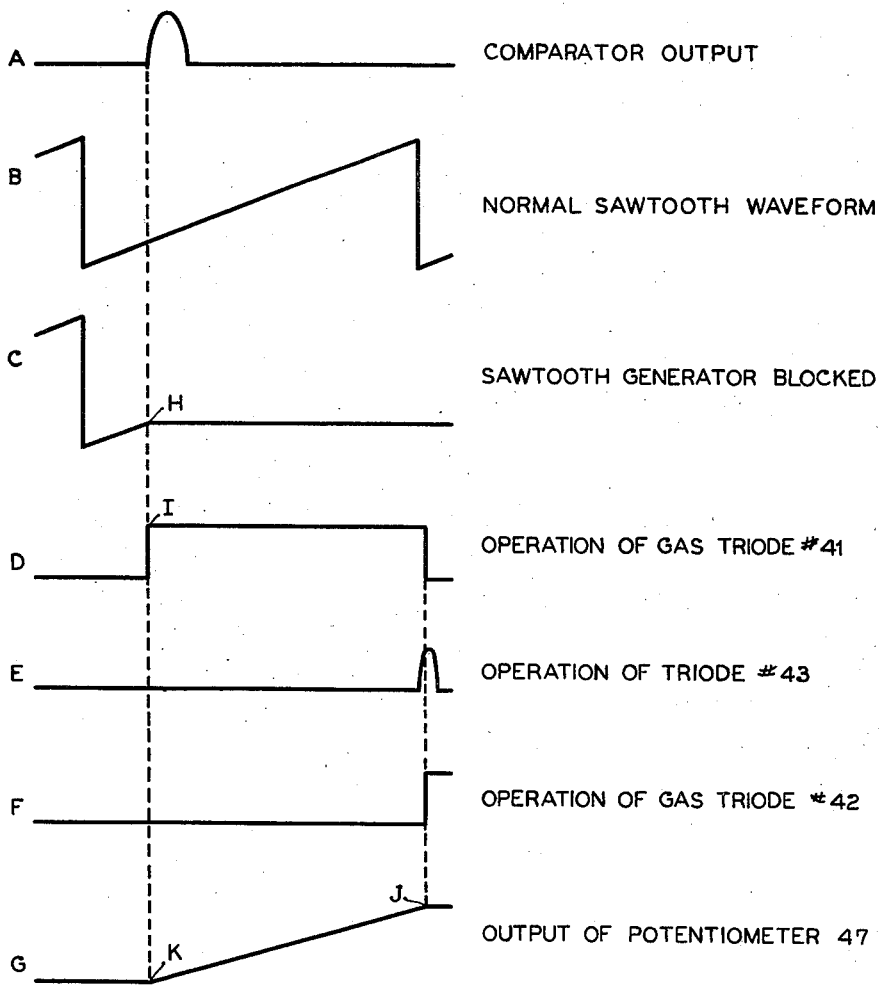

Patented June 29, 1948

2,444,151

UNITED STATES PATENT OFFICE 2,444,151

SCANNING RECEIVER FOR DETECTING SIGNALS OF UNKNOWN FREQUENCY

Warren H. Bliss, Orono, Maine, assignor to Radio Corporation of America, a corporation of Delaware Application November 16, 1942, Serial No. 465,706

20 Claims. (Cl. 250—20)

1

This invention relates broadly to improvements in apparatus for scanning a given frequency band of the radio spectrum, locating any new signal which appears therein, and controlling a device for making a record of such a signal.

In monitoring the radio spectrum for enemy and illegal stations, a transmitter which suddenly goes into action, sends a short message at high speed, and then shuts down quickly is very hard to detect. I have heretofore proposed a scanning receiver for detecting these illegal stations, and refer to my copending applications Serial No. 455,187, filed August 18, 1942, now Patent No. 2,411,494 granted Nov. 19, 1946, and Serial No. 457,282, filed September 4, 1942, now Patent No. 2,418,750, granted April 8, 1947.

An object of the present invention is to provide an improved method of and apparatus for electronically stopping and holding the scanning receiver on the frequency of the signals of the new station when found.

In brief, the present invention employs a scanning receiver for detecting telegraph stations within the range of frequencies scanned by the receiver, and recording the signals therefrom. For accomplishing this, there is provided a superheterodyne receiver which is swept or tuned rapidly over a given band of frequencies by means of a sweep device. The output of the receiver is arranged to be in the form of keyed tone whose modulations correspond to the modulations of the received signals. This keyed tone is supplied to a comparator device in which the signals of the known stations in the band of frequencies scanned by the receiver are neutralized or blanked out, so to speak, by locally generated pulses. To achieve this result, there are provided as many local blank-out pulse generators as there are different known stations in the band to be scanned. Thus, the presence of a new signal suddenly appearing in the frequency spectrum being scanned will have no compensating or blank-out pulse and can be recorded in a local recording device. A signal persistence checker or counter circuit serves to prevent random noise signals from falsely operating the recorder. A suitable trip device enables the recording mechanism to go into operation only when a new signal is detected which it is desired to record. At other times the recorder remains inactive. The system so far described is like the system of copending application Serial No. 457,282, filed September 4, 1942, by me and J. E. Smith.

A salient feature of the present invention resides in the circuit by means of which the scanning receiver is electronically stopped and held on the frequency of the signals of the newly found station. In the particular embodiment described hereinafter, this circuit includes a trigger device which blocks the saw-tooth voltage generated by the sweep device at the point in its cycle of operation where this new signal occurs. The scanning receiver is held on the newly found station, while the blocked saw-tooth voltage is automatically measured and automatically replaced by a fixed voltage of equal value. The receiver remains at the frequency of the new signals while the new signals are recorded.

A more detailed description of the invention follows in conjunction with a drawing, wherein:

Figs. 1a and 1b, taken together, diagrammatically illustrate a specific embodiment of the invention; and Fig. 2 graphically illustrates, by a series of wave forms, the operation of the improved feature of the present invention.

In Figs. 1a and 1b of the drawing, there is shown a scanning receiver of the type generally described in a copending application Serial No. 457,282, filed September 4, 1942, by me and J. E. Smith. In fact, the circuit elements shown within boxes and labeled "Superheterodyne receiver," "Reactance tube," "Comparator," "No. 1 phase shifter," "No. 2 phase shifter," "No. 1 pulse generator," "No. 2 pulse generator," "Sweep device," "Recorder" and "Monitor" are generally the same as those employed and described in the copending application supra. What is new, however, and forms the essence of the present invention is the addition of apparatus labeled "Receiver control unit." This new circuit unit functions to electronically stop the scanning superheterodyne receiver on the frequency of the signals of a newly found station.

Referring to Figs. 1a and 1b in more detail, there is shown a superheterodyne receiver 1 indicated diagrammatically in box form. The heterodyne oscillator to the receiver (not shown) has its frequency controlled by a parallel tuned circuit 2. The receiver 1 is designed to receive telegraph signals, and is provided with a suitable tone keying circuit for supplying interrupted audio tone output whose interruptions correspond to the modulations of the interruptions of the received telegraph signals. These keyed tone signals appear in the output circuit 3 of the superheterodyne receiver for subsequent use in the comparator device 4 to be described in more detail later. For causing the receiver to periodically scan a predetermined portion of the radio frequency spectrum, there is provided a reactance tube circuit 5 of a well known type, whose anode is connected to the tuned oscillatory circuit 2 of the heterodyne oscillator of the receiver, and whose control grid is connected by means of lead 10 to the output of a sweep device 6 which generates saw-tooth voltage waves. Since the reactance tube circuit 5 is well known in the frequency modulation art for providing a variable reactance output dependent upon the modulating voltages applied to the grid of the device, it is not believed necessary to describe this circuit further.

The sweep device 6 for generating saw-tooth voltage waves comprises, in the particular embodiment shown, a gaseous tube 7 which is arranged to rapidly discharge the condenser 8 through the space path of the tube after the charge on the condenser 8 has reached a critical value. Normally, the condenser 8 is linearly charged from a direct current power supply source 14 through a constant current limiting pentode 9. Negative bias for the grid of tube 7 is obtained from potentiometer 36. When the voltage on condenser 8 reaches a critical value, a discharge path is established through gas triode 7. Wave form B of Fig. 2 represents the normal saw-tooth wave form developed by the sweep device 6. A sixty cycle synchronizing source, labeled as such, is coupled to the grid of gas tube 7 through leads 11 and transformer 35 and assures the breakdown of the gas tube 7 at a desired point in the cycle of operations. The output of the sweep device 6 available at point 69 is connected through contact 75 and armature 74 of relay 66 in the "receiver control unit" and through lead 10 to the grid of the reactance tube 5 to provide sixty saw-tooth wave cycles per second to the reactance tube 5. As a result of this, the superheterodyne receiver will be caused to scan at a substantially uniform rate a predetermined portion of the radio frequency spectrum, after which the receiver will return to normal and repeat the scanning operation at the rate of sixty complete scanning operations per second. The range of the band of frequencies to be swept or scanned by the superheterodyne receiver is determined to a large extent by the magnitude of the saw-tooth variations of the sweep circuit, and the position of the band in the spectrum is adjustable by the usual controls in the receiver.

A multiplicity of blank-out or wipe-out pulse generators with their respective associated phase shifters are herein designated by the legends "No. 1 blank out pulse generator" and "No. 2 blank out pulse generator." Although only two generators are shown, there are usually provided as many pulse generators as there are known stations in the frequency band to be scanned whose signals are to be blanked out. If, in the operation of the system, there are more pulse generators than known stations, the excess number of pulse generators may be rendered inoperative by a suitable adjustment in a manner to be described later. All blank-out pulse generators are connected in parallel to the lead 21. Since the pulse generators are identical in construction and operation, it is deemed necessary to describe only one of these, let us say the No. 1 pulse generator.

This pulse generator is supplied with energy from the sixty cycle synchronizing source over leads 39 through reversing switch 12 of phase shifter 13. The phase shifter consists of a sixty cycle transformer whose primary winding is connected to the reversing switch 12 and whose secondary winding has shunted across it a condenser and a variable resistor 24. The junction point of the condenser and variable resistor is connected to the grid of a gaseous discharge device 14 (sometimes known as a "Thyratron"). The center point of the secondary winding of the sixty cycle transformer is connected to a bias resistor 15 which supplies negative bias for the grid of the glow tube 14. The condenser 16 across the glow tube 14 is arranged to be charged through the variable resistor 17 and to be discharged through the space path of the tube at a sixty cycle rate. The voltage from condenser 16 is supplied to a trigger circuit 18 composed of a pair of grid-controlled gas triodes 19 and 20 of the "Thyratron" type. Normally, tube 20 is in a state of conduction and tube 19 non-conducting. Upon the application of a pulse of suitable polarity from the tube 14 to the grid of tube 19, the state of conduction of the two tubes 19 and 20 will be reversed and there will be a negative pulse developed upon the anode of tube 19 which is applied to the comparator 4 by means of lead 21. This negative pulse occurs because the plate potential of tube 19 immediately drops for the duration of its conduction period. At this time, when tube 19 becomes conducting, tube 20 will become non-conducting by virtue of the commutating action of the trigger arrangement. The duration of the pulse applied to lead 21 by the trigger circuit 18 is controlled by the bias on tube 20, and more specifically, by the adjustment of tap 22 adjustable over bias resistor 23.

The particular time of occurrence or position in the sweep cycle of the pulse obtainable from the trigger circuit 18 is controlled by adjustment of the phase shifter 13 and more specifically by the adjustable resistor 24 in the phase shifter. Since the adjustment of the resistor 24 of the phase shifter will only provide a variation in position of the pulse obtainable from the trigger 18 over substantially one-half or 180° of the sweep cycle, it thus becomes necessary to provide means for changing the position of the pulse in the sweep cycle over the entire cycle and this is accomplished by means of the reversing switch 12 which by its operation enables the adjustable resistor 24 of the phase shifter to control the position of the pulse obtainable from the trigger circuit 18 for any desired portion of either of the two halves of the cycle. It should at this time be understood that the adjustment of the position of the pulse obtainable from the pulse generator is important because this position must be made to correspond to the position of the signal received from a known station in order to be able to blank or wipe out the signal from the known station in the comparator 4. The adjustment of the duration of the blank or wipe out pulse obtainable from the pulse generator is also important because the duration of the blank-out pulse must correspond to the duration of the signal received from the known station. The appearance of a blank-out pulse in the lead 21 will cause a relatively negative pulse to be applied to the comparator 4 for reasons which appear hereinafter.

As for the comparator 4, this circuit comprises a pair of push-pull vacuum tube amplifiers 25 and 26 operating as class B; that is, normally biased to a point of anode current cut-off. The grids of these amplifiers are connected to opposite terminals of the secondary winding of a single input transformer 27 which is designed to pass the keyed tone appearing in the output circuit 3 of the receiver. The combination of resistors 37 and 38 gives the proper bias for the grids of the tubes 25 and 26 by raising the cathode potential to a desired amount above ground potential. By making the cathode positive, the grid, in effect, is made negative since the grid is tied down to ground potential. The anodes of the tubes 25 and 26 of the comparator 4 are connected in push-pull to the opposite terminals of audio output transformer 28, also designed to pass the tone. In the operation of the comparator 4, the vacuum tubes 25 and 26 will normally pass the alternate half cycles of the tone appearing in the transformer 27. However, the application of a negative blank-out pulse over lead 21 from one of the blank out pulse generators will supply an additional negative bias to the grids of the tubes 25 and 26 which will prevent these tubes from passing current during the application of the blank out pulse even in the presence of tone signals on input transformer 27. It will thus be seen that by means of the pulse generators it is possible to prevent the comparator 4 from passing current at any particular time and for any desired duration in any sweep cycle.

The signal persistence checker or counter, including the trip device, labeled 30 in box form, serves to prevent random or fortuitous noise signals from falsely operating the recorder 40 in the output of the checker. This checker circuit 30 and its trip device may have any suitable form and preferably is of the same type described in copending application Serial No. 457,282, filed September 4, 1942, by me and J. E. Smith, now U. S. Patent No. 2,418,750, granted April 8, 1947, particularly boxes 30 and 42 of this patent. In effect, this signal persistence circuit is responsive solely to the presence of signals in the output of the comparator 4 which occur a predetermined number of times, let us say two or three, over successive cycles of receiver scanning for enabling the trip device to operate the drive motor M of the recorder 40.

A suitable recorder 40 herein shown as a magnetic tape 50 in conjunction with a recorder coil 51 serves to record the signals of the unknown station which have been detected. This magnetic tape is normally stationary and upon the operation of drive motor M by the trip device in circuit 30 the tape is caused to move between pairs of rollers 52 and 53. The rollers 53 are, in effect, drive rollers which are linked to the motor M by shaft S. The recorder coil 51 is connected by means of lead 77 to the output of transformer 28, as a result of which any signals appearing in the output of the transformer 28 will be recorded on the magnetic tape 50, although movement of the magnetic tape will not occur until the signal persistence counter 30 has caused the trip device of the checker to operate. The tape record will consist of standard telegraph signals as received on any radio-telegraph system because the receiver scanning has been stopped when this record starts, as will appear in more detail hereinafter.

The purpose of the monitor circuit 55 is to enable the operator to make suitable adjustments in the system. This monitor consists of a cathode ray oscilloscope 54 having horizontal deflection plates 56 and vertical deflection plates 57, together with an associated rectifier 58 for applying rectified pulses to one of the vertical deflection plates 57. The anode of the rectifier 58 is connected to the armature of a switch 59 by means of which the rectifier can be connected either directly to the keyed tone output circuit 3 of the superheterodyne receiver or directly to the output of the comparator device 4. Thus, the attendant is able to observe at a glance by suitably operating the switch 59, the appearance of the pulses in the output of the superheterodyne receiver 3 and also the appearance of the pulses in the output of the comparator 4. If the system is properly adjusted, the keyed tone pulses appearing in the output of the superheterodyne receiver 1 will not appear in the output of the comparator 4, except for the signals corresponding to those from the unknown or newly found station. The pulse shown in wave form A of Fig. 2, observable in the output of the comparator 4, represents that of a new signal from a new or unknown station which has suddenly appeared after all normal signal pulses from known stations have been balanced out in the comparator.

The apparatus so far described in detail is generally the same described in copending application Serial No. 457,282 supra, filed September 4, 1942. The new apparatus constituting the gist of the present invention comprises the addition of the "Receiver control unit" for electronically stopping the scanning receiver and holding the same on the frequency of the signals of the newly found station. This unit includes a magnetic brake and motor arrangement and an automatic voltage measuring and voltage replacing scheme. It will now be described in greater detail. The nucleus of the receiver control unit includes a pair of grid-controlled gaseous tubes 41 and 42 of the "Thyratron" type. Normally, both of these gas tubes are non-conducting. The control grid of tube 41 is connected to the trip device of signal persistence checker 30 by lead 78 and to the bias supply potentiometer 44 through resistor 85. The anode of tube 41 is coupled to the grid of pentode 9 of the sweep device 6 by way of condenser 60, and is coupled to the anode of tube 42 by way of commutating condenser 62. The anodes of gas tubes 41 and 42 are respectively coupled to the positive terminal of a source of direct current supply through resistors 61 and 65 and by way of switch 79. The cathode of gas tube 41 is connected to the coil winding of a relay 63 and then to ground. The cathode of gas tube 42 is similarly connected to ground through the coil winding of relay 66. The grid of tube 42 is connected to bias potentiometer 46 through resistor 64, and by way of condenser 67 to the grid of vacuum tube 43. Normally, that is, in the absence of a newly found signal, the sliders 48 and 49 on potentiometers 45 and 46 are at their lowermost points which are ground points. Vacuum tube 43 has its anode connected to the B+ supply through the secondary winding of transformer 68. The control grid of tube 43 is connected through the primary of transformer 68 to point 69 on the sweep device 6. The cathode of triode 43 is directly connected to the slider 48 of potentiometer 45.

An electric motor M' with a magnetic brake 70 is arranged to simultaneously drive the moving sliding contacts 48 and 49 of potentiometers 45 and 47, respectively, over drive shaft S'. This motor M' is connected to a source of power through normally open contact 72 (when this contact is closed) and the armature 71 of relay 63, and the magnetic brake 70 is connected to the same source of power through normally closed contact 73 and armature 71 of relay 63. The magnetic brake serves to stop drive shaft S' instantly after the power supply has been removed from drive motor M', as described later. Relay 66 has an armature 74 and a normally closed contact 75 for connecting point 69 of the sweep device 6 to the lead 10 extending to the scanning receiver circuit. The armature 74 and normally open contact 76 of relay 66 are for the purpose of connecting the sliding contact 49 of potentiometer 47 to the lead 10.

The operation of the system as a whole will now be described. The particular portion of the radio frequency spectrum to be scanned will first be chosen by adjustments in the receiver in well known manner. The sweep device 6 will cause the heterodyne oscillator of the receiver to sweep its frequency sixty times per second, in order that the receiver will repeatedly scan the selected portion of the radio frequency spectrum. By means of the blank-out pulse generators (as many as are needed) the positions and durations of the blank or wipe-out pulses from these generators are adjusted by the attendant to correspond in time of occurrence and duration to the signals from known stations received on the receiver and observed on the monitor. The adjustments of the pulse generators are primarily made by means of the adjustable phase shifters 13 and bias controls 22. Because the entire system is synchronized at sixty cycles, it will be evident that the pulse generators will each generate identical pulses for each cycle of scanning, although, if desired, the pulses may be different for the different pulse generators. The blank-out pulses generated by the different pulse generators appear at different times in lead 21 and bias the comparator 4 to way beyond anode current cut-off at those times during which signals from the known stations are being received. Thus, the only pulse which will appear in the output of comparator 4, as seen on the monitor 55 when the monitor is switched to the output of the comparator, will be a pulse from a newly found or unknown station suddenly starting up.

The appearance in the output of the comparator 4 of the signal corresponding to that from a newly found station (note wave form A of Fig. 2) will excite recorder coil 51 for making a record on the magnetic tape. However, the magnetic tape which is normally stationary, will not begin to move to furnish a continuous record until the signal persistence checker has functioned to operate its trip device. This will happen when the new signal appears on two or more successive scannings. In this way, the signal persistence checker circuit prevents the drive motor M from operating in case a random noise signal is passed by the receiver and comparator to the checker 30. Since it is possible for very strong and persistent noise to cause the appearance of noise signals twice within two successive cycles of scanning at substantially the same positions, it is preferred that the circuit constants of the signal persistent checker be so adjusted that at least three pulses be required to operate the trip device of the checker 30.

The operation of the system so far described corresponds to that described in copending application Serial No. 457,282, supra. The following operational description primarily concerns the improvements constituting the present invention.

The occurrence of a pulse in the output of the checker circuit 30 which will start the operation of the recorder 40 will also pass a pulse over lead 78 to block the operation of the sweep device or saw-tooth generator 6. Under normal initial operation, condenser 8 is charged at a uniform rate through pentode 9 and discharged periodically through gas triode 7. This causes the potential at point 69 to vary in the conventional saw-tooth manner with respect to the related ground potential established by the sliding contact on potentiometer 81, as shown by line B of Fig. 2. This saw-tooth voltage is applied to receiver 1 by way of the normally closed contacts 74—75 of relay 66 and the reactance tube 5. The receiver is caused to sweep linearly over the band of frequencies being investigated and does so repeatedly. When a new signal, as indicated by wave form A, appears at a certain point in the sweep cycle, the charging of condenser 8 is suddenly stopped. The pulse of wave form A not only starts the recorder 40 after the pulse has been passed by signal persistence checker 30, but it is also applied by way of lead 78 in the output of checker circuit 30 to the control grid of gas triode 41 to trigger it into a state of conduction. Relay 63 is energized and pentode 9 is temporarily driven to or beyond cut-off since its control grid is coupled to the anode of triode 41 by way of condenser 60. This occurs because the potential of the anode of triode 41 drops when conduction starts because of the suddenly developed drop in voltage across anode resistor 61 as a result of which a negative voltage is applied to the grid of tube 9. The blocking of pentode 9 instantly stops the charging of condenser 8 whose potential at point 69 then remains at a fixed value as shown by point H in wave form C of Fig. 2.

Since the frequency sweep of the receiver 1 is directly under the control of the saw-tooth voltage from condenser 8, it will be stopped at the point in its sweep where the new signal frequency is found. If it were practical to insulate condenser 8 so that it would hold its charge indefinitely, then the receiver would remain tuned to this new frequency as long as desired. Since this is not feasible, the voltage on the condenser 8 is automatically measured and automatically replaced by a voltage of equal value from a permanent source, as described hereinafter. The blocked voltage of condenser 8 remains in effect only as long as it takes for the new replacement voltage to be established.

The operation of relay 63, which takes place at the same instant that the saw-tooth generator is blocked (note Fig. 2, point I on wave form D), causes motor M' to operate over an obvious circuit and start moving the sliding contacts of potentiometers 45 and 47, by means of shaft S', from their initial positions of zero or ground potential toward the opposite end or more negative position. Vacuum triode 43 acts as a measuring tube to indicate how far potentiometers 45 and 47 must be driven to develop the proper voltage at their slides 48 and 49. Triode 43 has the saw-tooth voltage developed at point 69 applied to its grid as a varying negative bias voltage. During each saw-tooth cycle, this bias varies uniformly from a value slightly below cut off to a value considerably below cut off, and then returns quickly during the steep return stroke. When the blocking action (explained above) takes place, this tube 43 is temporarily left with a value of bias voltage directly related to the point H of wave form C of Fig. 2 on the saw-tooth cycle where the blocking action stops it.

Triode 43 also obtains a component of effective bias from the lower part of potentiometer 45, since the cathode of this triode is connected to slider 48 of this potentiometer. This component of bias is positive in polarity as regards its effect on the grid of tube 43, because it makes the cathode of 43 more negative as the slider moves up. The net or total effective bias on this triode is the combination of the saw-tooth voltage from point 69 and the potentiometer slider 48. As motor M' continues to operate after being started by relay 63, the component of bias from potentiometer 45 makes the grid of triode 43 gradually become more positive. A condition is finally reached such that conduction in tube 43 is started. Because of the regenerative action in this tube circuit caused by the grid to plate coupling through transformer 68, a pulse (as shown by wave form E of Fig. 2) is suddenly developed at the grid of triode 43. Potentiometers 45 and 47 are so designed and aligned that this pulse of wave form E will occur at the same instant that the potential on slider 49 has reached the same value as the potential of point 69. Wave form G of Fig. 2 shows how this potential on slider 49 of potentiometer 47 varies. At point K on wave form G, motor M' starts slider 49 in its upward movement and at point J of wave form G, when the pulse of wave form E occurs, the voltage on slider 49 has reached the same value as the potential of point 69, shown as point H on wave form C of Fig. 2.

When this condition is reached and the pulse of wave form E is suddenly developed, gas triode 42 which is normally non-conductive, is triggered or fired since its control grid is coupled to the control grid of triode 43 through condenser 67. Relay 66 is then operated and triode 41 ceases conduction because of the commutating action of condenser 62. This releases relay 63 which opens contacts 71—72 to stop motor M' and closes contacts 71—73 to energize magnetic brake 70. The above action takes place very quickly, thus leaving slider 49 at the same potential as point 69 of the saw-tooth circuit. The removal of the power supply from drive motor M' does not of itself assure the instantaneous stopping of the drive motor which ordinarily might continue rotating for a slight interval of time. The magnetic brake 70 assures the stopping of the shaft S' immediately upon removal of the power supply from motor M', even though this motor may continue to rotate. The action of relay 66, shown by wave form F of Fig. 2, causes the frequency control of receiver I to be switched from point 69 by way of armature 74 and contact 75 to the slider 49 by way of armature 74 and contact 76. The receiver frequency is then reliably and stably maintained to hold the new signals in tune for as long a period as desired.

During this period while the motor is in operation, the recorder, which was started when the new signal appeared, continues to register the incoming new signal without interruption and this recording operation continues on without irregularity when the control of the receiver is switched over by relay 66.

The potentiometers 48 and 49 are so designed in their manufacture that when tap 48 on the potentiometer 45 reaches such a point as to cause the tube 43 to pass current, the tap 49 will be at such a point on the potentiometer 47 that the voltage on this tap 49 as measured between tap 49 and ground will equal the voltage on condenser 8 as measured between point 69 and ground. To achieve this result, it may be that tap 49 should not start its travel from the very bottom of the resistor in the initial adjustment of the circuit and should be slightly displaced from ground. This initial adjustment should be made by the operator in setting up the apparatus, at which time the movement of tap 49 should be calibrated with respect to the movement of tap 48 which is unicontrolled therewith.

It should be understood that, if desired, additional features may be incorporated in the scanning receiver system per se, without altering the operation of the essential features of the present invention. For example, the scanning receiver may include a circuit for modifying the normally linear rate of tuning the receiver at any desired portion of the selected band of frequencies being scanned, as a result of which the receiver response characteristic may be improved. Such a feature is described in my copending application Serial No. 461,526, filed October 10, 1942, which issued June 1, 1948 as Patent No. 2,442,583.

What is claimed is:

1. A radio receiving system including a receiver and an output circuit therefor, said output circuit comprising a pulse counter which passes a signal pulse solely in response to repeated signal pulses appearing in said receiver over successive cycles of scanning, a circuit periodically tuning said receiver to scan a desired radio frequency band, and electric tube means coupled to said output circuit and also coupled to said tuning circuit, said electric tube means being responsive to a signal pulse passed by said output circuit for stopping the scanning of said receiver at a point in said band corresponding to the frequency of the signal pulse.

2. The combination with a telegraph receiver, of means for periodically changing the tuning of said receiver over a selected band of frequencies, said means including a saw-tooth generator circuit having a condenser, a source of potential for charging said condenser, and a space discharge path through which said condenser discharges upon reaching a critical value, and electron discharge tube means coupled to the output of said receiver and responsive to a pulse therein representative of a signal from a transmitting station to be observed for blocking the charging of said condenser with a concomitant stopping of the tuning of said receiver.

3. The combination with a telegraph superheterodyne receiver having a heterodyne oscillator, of means for periodically changing the tuning of said oscillator over a predetermined range of frequencies, said means including a sweep device comprising a saw-tooth generator having a condenser, a source of potential for charging said condenser, and a tube through which said condenser discharges upon reaching a critical value, and means including an electron discharge tube coupled to the output of said receiver and responsive to a pulse therein representative of a signal from a transmitting station to be observed for blocking the charging of said condenser with a concomitant stopping of the tuning of said receiver.

4. The combination with a radio receiver, of means for periodically changing the tuning of said receiver to cause the same to scan a desired portion of the radio frequency spectrum, said means including a saw-tooth voltage wave generator, additional means for balancing out signals emanating from known transmitting stations in said portion of the spectrum, and means including electron discharge device circuits responsive to new signals in said portion of the spectrum which emanate from a newly found station suddenly appearing during the scanning of said spectrum for blocking the operation of said saw-tooth voltage wave generator.

5. The combination with a radio receiver, of means for periodically changing the tuning of said receiver to cause the same to scan a desired portion of the radio frequency spectrum, said means including a saw-tooth voltage wave generator, local pulse generators for balancing out signals emanating from known transmitting stations in said portion of the spectrum, and means including an electron discharge device circuit responsive to new signals in said portion of the spectrum which emanate from a newly found transmitting station suddenly appearing during the scanning of said spectrum for blocking the operation of said saw-tooth generator.

6. The combination with a telegraph receiver of means for periodically changing the tuning of said receiver over a selected band of frequencies, said means including a saw-tooth voltage wave generator circuit having a condenser, a source of potential for charging said condenser, and a tube through which said condenser discharges upon reaching a critical value, means including an electric tube circuit coupled to the output of said receiver and responsive to a pulse therein representative of a signal from a station to be observed for blocking the charging of said condenser with a concomitant stopping of the tuning of said receiver, and means for automatically substituting for the blocked voltage on said condenser a fixed voltage whose value is equal to said blocked voltage.

7. In a radio telegraph receiving system for scanning a portion of the radio frequency spectrum, means for periodically tuning the receiver over a selected band of frequencies, said means including a saw-tooth voltage wave generator, a local pulse generator, means for combining the pulses from said local pulse generator with the output of said receiver, whereby certain signals from the output of said receiver may be blanked out, and means responsive to other signals in the output of said receiver for blocking said saw-tooth generator at the point in its cycle of operation where these other signals occur.

8. The method of operating a radio receiving system which includes the steps of repeatedly scanning a selected portion of the radio frequency spectrum in accordance with the wave form of a continually varying voltage, balancing out from the output of said receiving system known signals appearing in said portion of the spectrum, utilizing new signals in said portion of the spectrum to stop said varying voltage at a point on its cycle where the new signals occur, with a concomitant stopping of said scanning, and replacing said voltage at the value at which it has been stopped by a fixed voltage of equal value.

9. The combination with a radio receiver, of means including a saw-tooth voltage wave generator for periodically changing the tuning of said receiver to cause the same to scan a desired portion of the radio frequency spectrum, means for balancing out signals in said receiver which emanate from known transmitting stations in said portion of the spectrum, a signal persistence checker circuit coupled to the output of said receiver for passing a pulse only when it is repeated a plurality of times in successive cycles of operation, a recorder system arranged to become operative upon the passage of a pulse by said signal persistence checker circuit, and means including an electron discharge device circuit responsive to the passage of a pulse by said signal persistence checker circuit for blocking the operation of said saw-tooth generator.

10. In combination, a saw-tooth voltage wave generator comprising a condenser, a normally conductive electron current control device in series with said condenser, said device including a control electrode, means for linearily charging said condenser through said electron current control device, and a discharge path for said condenser, an electron discharge device circuit operative only during the charging time of said condenser for producing a voltage pulse of negative polarity, and a connection from a control electrode of said electron current control device to said electron discharge device circuit, whereby the production of a pulse of negative polarity by said electron discharge device circuit cuts off the current through said electron current control device and blocks the charging action of said condenser, and a utilization circuit coupled to said saw-tooth generator and responsive to the wave produced by said generator.

11. In combination, a saw-tooth voltage wave generator comprising a condenser, a normally conductive electron current control device in series with said condenser, said device including a control electrode, means for linearly charging said condenser through said electron current control device, and a discharge path for said condenser, a receiver, and an electron discharge device operative only during the charging time of said condenser, means responsive to a signal passed by said receiver for producing a voltage pulse of negative polarity, and a connection from a control electrode of said electron current control device to said electron discharge device means, whereby the production of a pulse of negative polarity by said electron discharge device means cut off the current through said electron current control device and blocks the charging action of said condenser.

12. In combination, a saw-tooth voltage wave generator comprising a condenser, a normally conductive electron current control device in series with said condenser, said device including a control electrode, means for linearly charging said condenser through said electron current control device, and a discharge path for said condenser, a normally non-conductive grid-controlled gaseous tube, a direct current impedance element connected between the anode of said tube and the positive terminal of a source of polarizing potential, a capacitive connection between the anode of said tube and the control electrode of said electron current control device, and means coupled to the grid of said gaseous tube for applying a pulse of relatively positive polarity thereto to cause said gaseous tube to become suddenly conductive, upon which the conductivity of said gaseous tube generates a pulse of negative polarity in its anode circuit which biases said electron current control device to cut off through said capacitive connection with a concomitant blocking of said saw-tooth generator.

13. In combination, a saw-tooth voltage wave generator comprising a condenser, a normally conductive electron current control device in series with said condenser, said device including a control electrode, means for linearly charging said condenser through said electron current control device, and a discharge path for said condenser, a normally non-conductive grid-controlled gaseous tube, a direct current impedance element connected between the anode of said tube and the positive terminal of a source of polarizing potential, a capacitive connection between the anode of said tube and the control electrode of said electron current control device, and means coupled to the grid of said gaseous tube for applying a pulse of relatively positive polarity thereto to cause said gaseous tube to become suddenly conductive, upon which the conductivity of said gaseous tube generates a pulse of negative polarity in its anode circuit which biases said electron current control device to cut off through said capacitive connection with a concomitant blocking of said saw-tooth generator, a utilization circuit coupled to the condenser of said saw-tooth generator for utilizing the saw-tooth voltage normally appearing thereon, and apparatus controlled by and responsive to the firing of said gaseous tube for measuring the voltage on said condenser of said saw-tooth generator in its blocked condition and for replacing this voltage by a fixed voltage of equal value.

14. The combination defined in claim 13, characterized in this that said utilization apparatus is a radio receiving system, and said apparatus controlled by and responsive to said gaseous tube includes a drive motor, a potentiometer having a slider driven by said motor, and a normally non-conductive electron discharge device which becomes operative when said slider reaches a predetermined position.

15. In combination, a saw-tooth voltage wave generator comprising a condenser, a normally conductive electron current control device in series with said condenser, said device including a control electrode, means for linearly charging said condenser through said electron current control device, and a discharge path for said condenser, electron discharge device means for producing a voltage pulse of negative polarity, and a connection from a control electrode of said electron current control device to said electron discharge device means, whereby the production of a pulse of negative polarity by said electron discharge device means cuts off the current through said electron current control device and blocks the charging action of said condenser, and a superheterodyne receiver having its heterodyne oscillator coupled to the output of said generator and responsive thereto for changing the tuning of the receiver.

16. In a radio receiving system, means for periodically changing a reception characteristic of the receiver over a desired range, said means including a saw-tooth voltage wave generator, means including a pulse generator for balancing out from the output of said system signals received from known transmitting stations appearing in said range, and means responsive to a signal received from an unknown transmitting station suddenly appearing in the output of said receiver for blocking said saw-tooth generator at the point in its cycle of operation where this last signal occurs.

17. The method of operating a radio receiving system which includes the steps of repeatedly scanning a selected portion of the radio frequency spectrum in accordance with the wave form of a continually varying voltage, balancing out from the output of said receiving system signals received from known transmitting stations appearing in said portion of the spectrum, and utilizing a signal received from an unknown transmitting station in said portion of the spectrum to stop said varying voltage at a point on its cycle where the new signal occurs, with a concomitant stopping of said scanning.

18. In a receiving system, a tunable receiver, a vacuum tube generator of periodically repeated waves coupled to said receiver for changing the tuning thereof, and means coupled to said receiver and responsive to a signal received and passed by said receiver for rendering said generator non-conductive at the particular point in its cycle of operation where the signal occurs.

19. In a radio receiving system, a tunable receiver, a saw-tooth voltage wave tube generator controlling the tuning of said receiver, and means responsive to a signal received and passed by said receiver for rendering said generator non-conductive at the particular point in its cycle of operation where the signal occurs.

20. In a radio receiving system, a tunable receiver, a tube generator of saw-tooth voltage waves coupled to said receiver for changing the tuning thereof, and electronic means responsive to a signal received and passed by said receiver for immediately rendering said generator non-conductive at the particular point in that portion of its cycle of operation during which the saw-tooth voltage increases from a minimum to a maximum.

WARREN H. BLISS.

REFERENCES CITED

The following references are of record in the file of this patent:

UNITED STATES PATENTS

| Number | Name | Date |
| --- | --- | --- |
| 1,774,146 | Lesti | Aug. 26, 1930 |
| 1,917,268 | Mirick | July 11, 1933 |
| 1,970,424 | Frink | Aug. 14, 1934 |
| 1,994,232 | Schuck, Jr. | Mar. 12, 1935 |
| 2,038,054 | Nicolson | Apr. 21, 1936 |
| 2,056,200 | Lowell | Oct. 6, 1936 |
| 2,102,951 | Hackenberg | Dec. 21, 1937 |
| 2,084,760 | Beverage | June 22, 1937 |
| 2,237,514 | White | Apr. 8, 1941 |
| 2,262,218 | Andrews | Nov. 11, 1941 |
| 2,273,914 | Wallace | Feb. 24, 1942 |
| 2,279,151 | Wallace | Apr. 7, 1942 |
| 2,281,948 | Pieplow | May 5, 1942 |
| 2,283,523 | White | May 19, 1942 |
| 2,287,925 | White | June 30, 1942 |
| 2,297,742 | Campbell | Oct. 6, 1942 |
| 2,304,871 | Andrews | Dec. 15, 1942 |
| 2,312,203 | Wallace | Feb. 23, 1943 |
| 2,326,738 | Andrews | Aug. 17, 1943 |

FOREIGN PATENTS

| Number | Country | Date |
| --- | --- | --- |
| 425,626 | Great Britain | Mar. 19, 1935 |
| 455,765 | Great Britain | Oct. 27, 1936 |